(12) United States Patent
Ruopp

(10) Patent No.: US 10,053,183 B2
(45) Date of Patent: Aug. 21, 2018

(54) MASTER UNIT

(71) Applicant: Gustav Magenwirth GmbH & Co. KG, Bad Urach (DE)

(72) Inventor: Michael Ruopp, Berghuelen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 6 days.

(21) Appl. No.: 15/226,190

(22) Filed: Aug. 2, 2016

(65) Prior Publication Data

US 2017/0036733 A1   Feb. 9, 2017

(30) Foreign Application Priority Data

Aug. 4, 2015 (DE) .................. 10 2015 112 801

(51) Int. Cl.
*B62L 3/02* (2006.01)
*B60T 7/10* (2006.01)
*B60T 11/16* (2006.01)

(52) U.S. Cl.
CPC .............. *B62L 3/023* (2013.01); *B60T 7/102* (2013.01); *B60T 7/108* (2013.01); *B60T 11/165* (2013.01); *B60T 11/16* (2013.01)

(58) Field of Classification Search
CPC ................................ B60T 7/102; B62L 3/023
USPC .................................................. 60/550, 594
See application file for complete search history.

(56) References Cited

U.S. PATENT DOCUMENTS

| 5,636,518 | A | * | 6/1997 | Burgoyne | B62K 23/02 60/594 |
| 6,003,639 | A | * | 12/1999 | Buckley | B62K 23/06 188/26 |
| 6,957,534 | B2 | * | 10/2005 | Lumpkin | B60T 11/22 188/26 |
| 7,503,237 | B2 | * | 3/2009 | Cornolti | B60T 7/10 74/502.2 |

(Continued)

FOREIGN PATENT DOCUMENTS

DE   102013200824 A1   7/2014
EP       0173513 A2    8/1985
(Continued)

*Primary Examiner* — Thomas E Lazo
(74) *Attorney, Agent, or Firm* — Reinhart Boerner Van Deuren P.C.

(57) ABSTRACT

In order to improve a master unit for vehicles, in particular for vehicles steered by a handlebar, comprising a housing, a master cylinder unit provided in the housing, an actuation unit for manually actuating the master cylinder unit with a push lever pivotable relative to the housing about a push lever pivot axis and with a push element transmitting a movement of the push lever to the master cylinder unit, which push element is provided on the push lever and, when the actuation unit is manually actuated, acts, via a pressure surface at a contact point, on a contact surface of the master cylinder unit, such that an optimal adaptation to the particular circumstances is possible, it is proposed that, in order to adjust a transmission ratio of the actuation unit with which the actuation unit acts on the master cylinder unit, a lever arm effective in the event of the actuation is adjustable between the contact point and the push lever pivot axis by means of an adjustment device.

31 Claims, 6 Drawing Sheets

(56) References Cited

U.S. PATENT DOCUMENTS

| | | | | |
|---|---|---|---|---|
| 7,963,114 | B2* | 6/2011 | Moore | B60T 11/16 |
| | | | | 188/344 |
| 8,336,308 | B2* | 12/2012 | Gherardi | B62L 3/023 |
| | | | | 60/594 |
| 8,863,612 | B2* | 10/2014 | Owyang | B62K 23/06 |
| | | | | 74/502.2 |

FOREIGN PATENT DOCUMENTS

| | | |
|---|---|---|
| EP | 0 368 120 A1 | 5/1990 |
| EP | 1 894 802 A2 | 3/2008 |
| WO | WO 2008/056379 A1 | 11/2006 |
| WO | WO 2014/111544 A2 | 7/2014 |

* cited by examiner

MASTER UNIT

CROSS-REFERENCE TO RELATED PATENT APPLICATION

This patent application claims the benefit of German application No. 10 2015 112 801.2, filed Aug. 4, 2015, the teachings and disclosure of which are hereby incorporated in their entirety by reference thereto.

BACKGROUND OF THE INVENTION

The invention relates to a master unit for vehicles, in particular for vehicles steered by a handlebar, comprising a housing, a master cylinder unit provided in the housing, an actuation unit for manually actuating the master cylinder unit with a push lever which is pivotable relative to the housing about a push lever pivot axis and with a push element transmitting a movement of the push lever to the master cylinder unit, which push element is provided on the push lever and, when the actuation unit is manually actuated, acts, via a pressure surface at a contact point, on a contact surface of the master cylinder unit.

Master units of this type are known from the prior art, for example DE 10 2013 200 824 A1.

With these known master units, however, there is no option to adapt these in a suitable manner to the feel of an operator.

The object of the invention is therefore to improve a master unit of the type described in the introduction such that an optimal adaptation to the particular circumstances is possible.

SUMMARY OF THE INVENTION

This object is achieved in accordance with the invention, with a master unit of the type described in the introduction, in that, in order to adjust a transmission ratio of the actuation unit with which the actuation unit acts on the master cylinder unit, a lever arm effective during the actuation is adjustable between the contact point and the push lever pivot axis by means of an adjustment device.

The advantage of this solution can be seen in the fact that it is possible herewith to optimally adapt the mode of action of the master unit according to the invention to the feel of the particular operator.

In particular, with the solution according to the invention, it is also possible to configure the adjustment device such that the lever arm effective during the actuation can be adjusted between the contact point and the push lever pivot axis without influencing a starting position of the master cylinder unit and/or the actuation unit.

By way of example, it would be possible, with the adjustment device, to vary the position of the push lever pivot axis relative to the housing in such a way that the lever arm effective when the actuation unit is actuated also varies.

A particularly favourable solution makes provision for the adjustment device to be arranged on the actuation unit and for a spacing between the contact point and the push lever pivot axis to be adjustable by means of the adjustment device.

In this case, there is thus no change to the position or orientation of the push lever relative to the master unit, but instead a change in the spacing between the contact point and the push lever pivot axis, which change can be easily implemented.

In particular, provision is made here for the pressure surface of the push element and the push lever pivot axis to be positionable and therefore adjustable relative to one another, i.e. for a spacing therebetween to be variable, by means of the adjustment device.

In principle, a movability of the push lever pivot axis relative to the push lever could be provided here.

A particularly advantageous embodiment of the adjustment device makes provision for the position of the push element relative to the push lever to be adjustable by means of said adjustment device.

An adjustability of this type of the position of the push element relative to the push lever has the advantage that the pivotable mounting of the push lever on the housing can remain unaffected and the position of the push element is varied merely in the region of the push lever in accordance with the desired operability.

In particular, it is favourable when, by means of the adjustment device, the spacing of the contact point from the push lever pivot axis is adjustable whilst the master cylinder unit remains unchanged in a predefined starting position.

This solution has the great advantage that the starting position of the master cylinder unit remains unaffected as the transmission ratio is changed.

A particularly advantageous solution also makes provision for a contact surface of the master cylinder unit which can be acted on by the pressure surface in the starting position of the master cylinder unit to be a surface extending transversely to a central axis of the master cylinder unit, in particular a flat surface.

The adjustment of the transmission ratio by means of the adjustment device can be provided particularly advantageously in terms of structure when the contact surface is formed in this way.

Here, the adjustment direction is preferably such that, when the spacing of the contact point relative to the push lever pivot axis changes, the contact point shifts parallel to the contact surface, wherein the master cylinder unit is in its starting position.

This solution thus offers the possibility to adjust the transmission ratio of the actuation unit independently of other settings, for example the reach or a determination of the starting position for determining the response behaviour of a hydraulic system, comprising the master unit and a slave unit.

No further details with regard to the arrangement of the adjustment device were provided in conjunction with the previous constructions.

A particularly advantageous solution thus makes provision for the adjustment device to be arranged at a spacing from the contact surface of the master cylinder unit.

In particular, provision is preferably made for the adjustment device to be arranged on a side of the push element averted from the master cylinder unit and for the push element to extend from the adjustment device to the contact surface.

The adjustment device can be formed in a wide range of different ways.

An advantageous solution makes provision for the adjustment device to comprise a guide body which is movably guided in a guide direction on a guide mount provided on the push lever.

By means of a longitudinal guidance of this type, a simple possibility is provided for positioning the push element in a suitable manner relative to the push lever pivot axis.

Here, a longitudinal guide as described above could comprise a curved course of the guide mount.

A particularly simple implementation of a longitudinal guide of this type makes provision for the guide mount and the guide body to form a linear guide.

In order, where possible, to leave the starting position unchanged when the transmission ratio is adjusted, provision is preferably made for the guide device to extend approximately parallel to a surface defined by the contact surface.

A guide of the push element can be provided particularly easily in terms of structure when the guide direction is oriented approximately parallel to a plane extending perpendicularly to the central axis of the master cylinder, wherein, in this case, the contact surface in particular lies in a plane extending perpendicularly to the central axis.

In order to be able to move the guide body in the guide direction and fix the guide body in the particular position, provision is preferably made for the guide body to be movable in the guide direction by means of an adjustment element.

The adjustment element can be formed in a wide range of different ways in principle.

By way of example, the adjustment element could have a curved path which acts on the guide body.

A particularly simple solution makes provision for the adjustment element to comprise an adjustment spindle which co-operates with a spindle nut portion, wherein in particular the adjustment spindle co-operates with the guide body or the push lever and the spindle nut portion co-operates with the push lever or the guide body.

An adjustment spindle of this type constitutes an option, that can be easily implemented, for moving the guide body on the one hand and for fixing the guide body in the particular desired position on the other hand.

Here, it is particularly advantageous if the adjustment element has an annular body which acts on the guide body such that this is positionable in a defined manner in the guide direction, in particular in various positions.

Here, it is particularly favourable if the guide body is fixable by the annular body in two movement directions opposite one another and extending in the guide direction, such that in each case the guide body is easily positionable by the adjustment element.

A wide range of different embodiments is conceivable for the co-operation of the annular body and the guide body.

An embodiment of particularly simple structure makes provision for the annular body to engage in a cutout in the guide body and to thus be able to position the guide body in the desired positions.

So as to also prevent the adjustment element itself from changing its position, in particular its rotary position, provision is preferably made for the adjustment element to be fixable in each of the various positions by means of a detent unit.

The detent unit can also be formed in a wide range of different ways.

Provision is preferably made for the annular body to have at least one detent indentation, in which at least one detent element engages.

For the variable adjustment of the starting position of the piston of the master cylinder unit, the push element with the pressure surface, in an alternative solution, is movable relative to the guide body, and therefore a spacing between the pressure surface and the guide body is adjustable.

For this purpose, an adjustment unit which comprises co-operating adjustment threads is provided, for example. The push element preferably comprises a peripheral adjustment thread, which is engaged with an adjustment thread of the guide body such that a relative rotation of the adjustment thread enables a movement of the push element relative to the guide body.

Alternatively to forming the adjustment device with use of a guide body having a guide mount, a further advantageous solution makes provision for the adjustment device to comprise a pivot bearing body mounted on the actuation lever, by means of which pivot bearing body the push element is pivotable about an adjustment axis and is positionable in the particular pivot position.

Here, the push element could be formed in a wide range of different ways.

Here, an advantageous solution makes provision for the push element to extend radially to the pivot bearing body.

In order to be able to fix the push element in the various pivot positions, provision is preferably made for the pivot position of the push element about the adjustment axis to be fixed by an adjustment element acting on a stop arm connected to the pivot bearing body for conjoint rotation therewith.

There are also various possibilities with regard to the implementation of the stop arm.

By way of example, the stop arm can be held on the pivot bearing body.

A further advantageous solution makes provision for the stop arm to be formed by a guide pin of the push element penetrating the pivot bearing body, such that a particularly simple structure can be implemented.

Furthermore, provision is preferably made for the push element to be guided on the pivot bearing body radially thereto so as thus have the possibility of being able to predefine the movement of the pressure surface, as the various lever ratios are adjusted, in a manner deviating from a circular path about the pivot axis of the pivot bearing body.

Provision is made in particular for the push element, with regard to its movability radially to the pivot bearing body, to be supported by a guide track arranged on the push lever.

With a guide track of this type, the path over which the pressure surface travels as the various transmission ratios are set can thus be predefined.

In particular, provision is made here for the guide track to be formed in such a way that it positions the push element in such a way that the contact point, as the pivot positions change, moves approximately parallel to the contact surface, in particular parallel to a geometric plane provided by the contact surface.

No other details were provided previously with regard to the overall design of the actuation unit further to the push lever.

In the simplest case, the push lever itself could be formed such that it has a grip region.

However, a particularly favourable solution makes provision for the actuation unit to have an actuation lever which comprises a grip region for manually handling the actuation unit, and, when the actuation lever is being manually handled, for this to act on the push lever in the sense of an actuation of the master cylinder unit.

This means that, with this solution, the actuation lever is not formed identically to the push lever and in particular also is not formed in one piece with the push lever.

The actuation lever is preferably movable, in particular pivotable, relative to the push lever.

In principle, it would be possible to mount the actuation lever on the housing so as to be pivotable about the same pivot axis as the push lever.

A solution of this type is described for example in DE 10 2013 200 824 A1.

However, a particularly expedient solution makes provision for the push lever to be mounted via a first end region on the housing so as to be pivotable about the push lever pivot axis and for the push lever to extend as far as a second end region, at which the actuation lever is mounted so as to be movable, in particular pivotable.

So as to be able to adjust the reach with an arrangement of this type of the actuation lever, provision is preferably made for an orientation of the actuation lever relative to the push lever to be adjustable by a reach adjustment device.

In particular, an adjustment of this type of the reach is implemented when the actuation unit is not manually actuated.

Here, the reach is defined by a spacing of the grip region of the actuation lever from the handlebar.

Further features and advantages of the invention are the subject of the following description and of the schematic illustration of some exemplary embodiments.

DETAILED DESCRIPTION OF THE INVENTION

Figure 1:
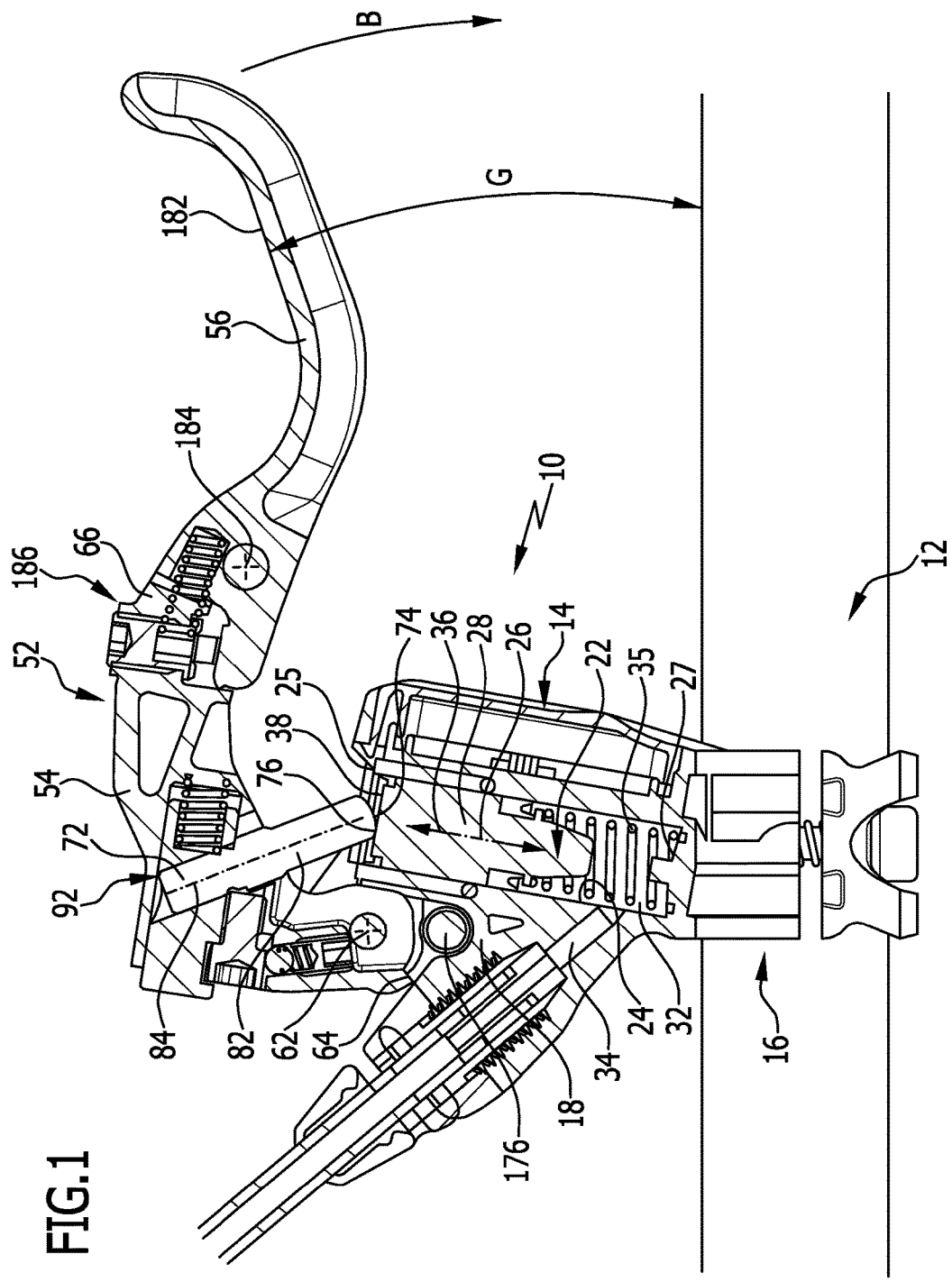
FIG. 1 shows a longitudinal section through a master unit according to the invention.

A first exemplary embodiment shown in FIG. 1 of a master unit 10 for vehicles, in particular for vehicles steered by a handlebar, comprises a housing 14, which is mountable on a handlebar 12 of the vehicle and which has a holding unit 16, which is fixable, in particular clampable, to the handlebar 12.

The housing 14 also comprises a housing body 18, in which a master cylinder unit designated as a whole by 22 is arranged.

The master cylinder unit 22 is formed here for example by a cylinder bore 24, which is provided in the housing body 18, extends along a central axis 26 from an open end 25 in the housing body 18 to a termination 27, and in which a piston 28 is guided movably in the direction of the central axis 26.

The cylinder bore 24, the base 25 and the piston 28 here delimit a pressure space 32, which receives a hydraulic medium which is feedable via a connector 34 provided in the housing body 18 via a hydraulic line to a hydraulic slave unit, for example a slave cylinder of a brake unit.

In order to actuate the master cylinder unit 22, the piston 28 is provided with a contact surface 38, which preferably extends transversely or perpendicularly to a movement direction 36 of the piston 28 extending parallel to the central axis 26.

The piston 28 is acted on by a spring element 35, which is supported on the termination 27, in the direction of a starting position defined by a stop element, in which starting position the pressure space 32 has its maximum volume and the piston 28 is close to the open end of the cylinder bore 24.

In order to actuate the master cylinder unit 22, in particular in order to act on the piston 28 so as to move this in the movement direction 36, in particular in the sense of a reduction of the pressure space 32, an actuation unit designated as a whole by 52 is provided, which on the one hand comprises a
push lever 54 and on the other hand an actuation lever 56, which is movable manually toward the handlebar 12 in an actuation direction B in order to actuate the master cylinder unit 22.

In the illustrated exemplary embodiment the push lever 54 is mounted on the housing 14, in particular the housing body 18, so as to be pivotable about a push lever pivot axis 62, more specifically is preferably mounted via a first end 64 of the push lever 54, wherein the push lever 54 extends from the first end 64 to a second end 66, which is engaged by the actuation lever 56.

The push lever 54 preferably extends predominantly on a side, averted from the master cylinder unit 22, of a geometric plane E1 defined in terms of its position by the contact surface 38.

Figure 2:
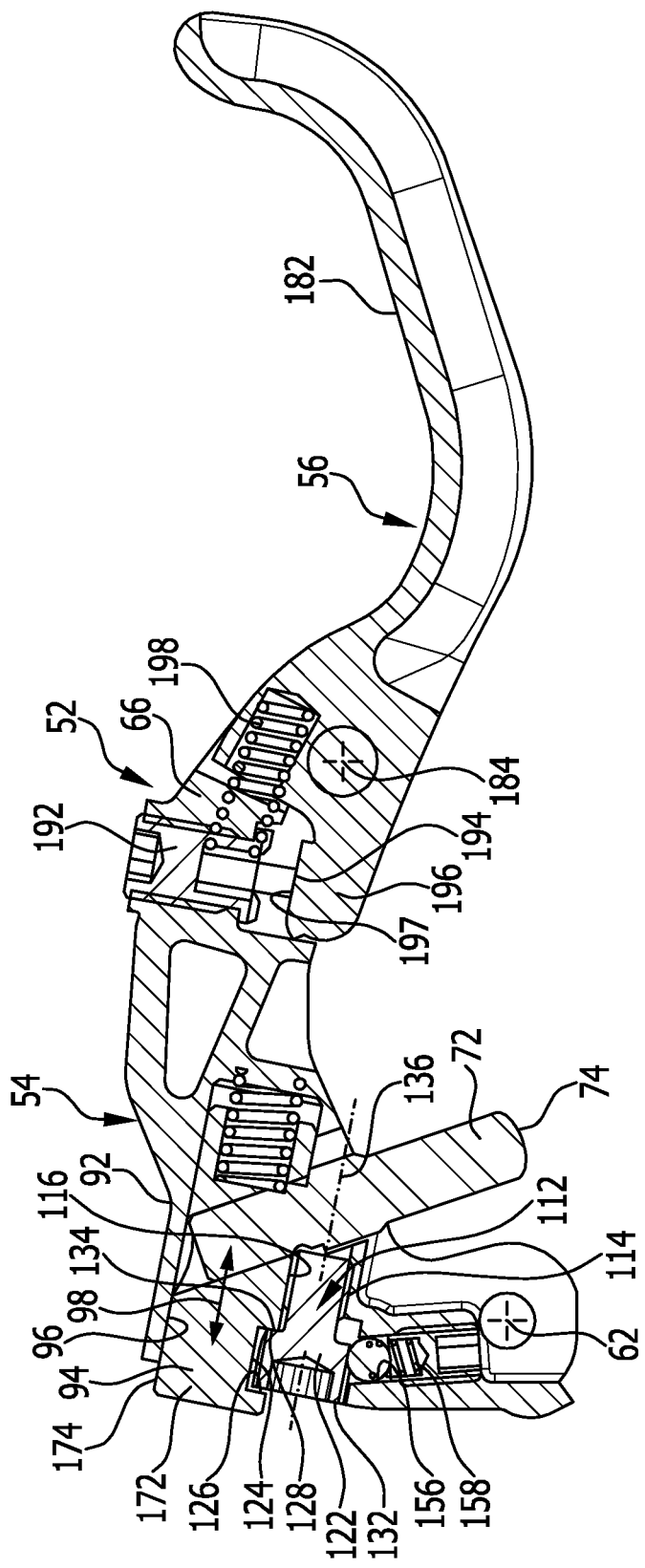
FIG. 2 shows an enlarged illustration of the actuation unit in the same section as FIG. 1.

In order to act on the contact surface 38 of the master cylinder unit 22, the push lever 54 is provided with a push element designated as a whole by 72, which, as illustrated in particular in FIG. 2, bears a pressure surface 74 at the end, which pressure surface is preferably formed as a rounded or curved surface and contacts the contact surface 38 in the region of a contact point 76 when acting on the master cylinder unit 22.

In the illustrated exemplary embodiment the push element 72 is formed for example as a cylindrical plunger 82, which extends, starting from the push lever 54, in the direction of the contact surface 38 and at the end face carries the curved pressure surface 74, wherein the plunger 82 has a curvature extending transversely to the central axis of the plunger.

Figure 3:
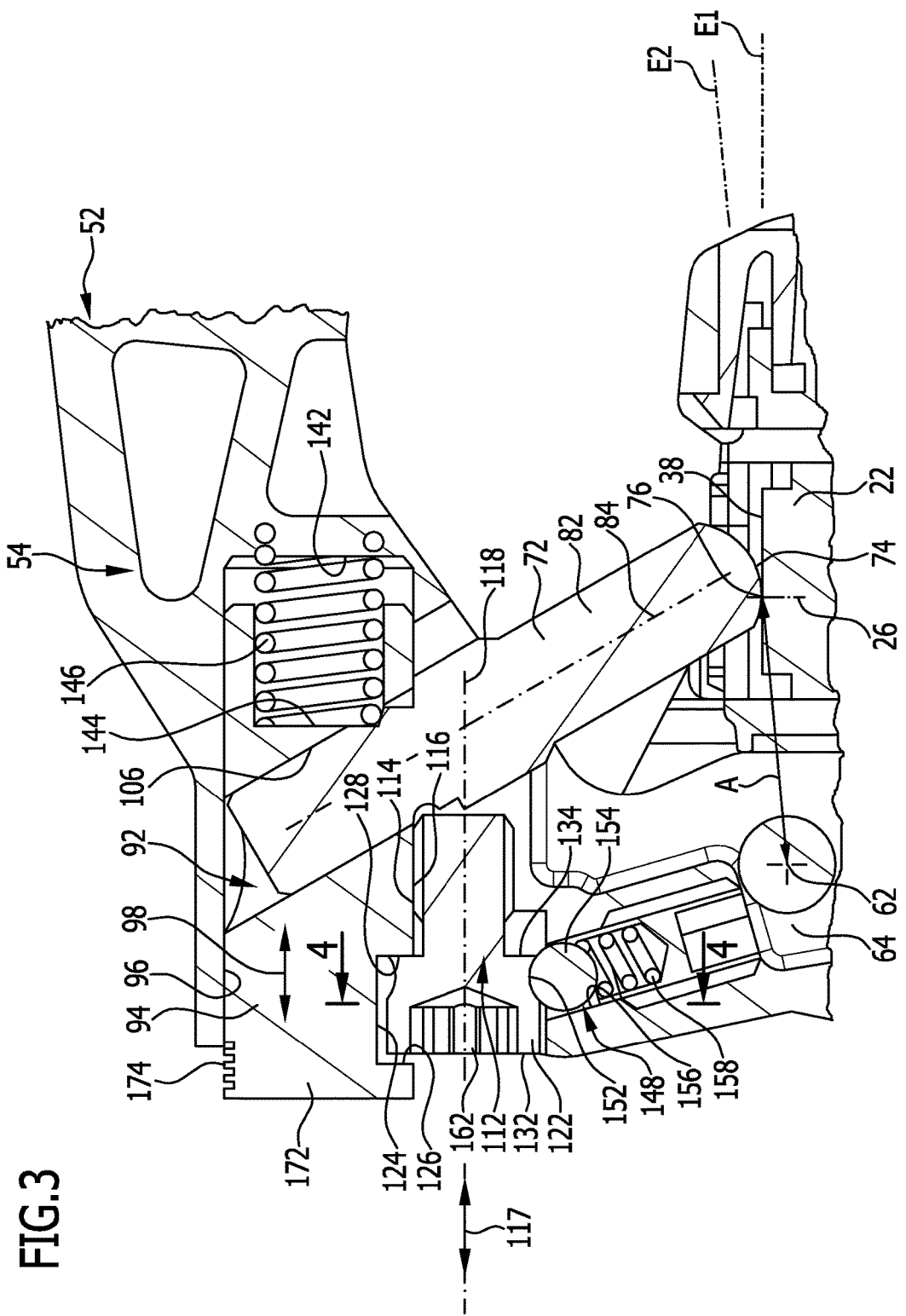
FIG. 3 shows an illustration, again enlarged, of the actuation unit with the push element in co-operation with a master cylinder unit in the starting position of the master cylinder unit.

In particular, the pressure surface 74, in an advantageous embodiment of the plunger 82, extends in a curved manner at least in a geometric plane extending perpendicularly to the push lever pivot axis 62 and intersecting the push element 72, said geometric plane corresponding to the drawing plane in FIG. 1 to FIG. 3.

Provided the pressure surface 34 of the plunger 82 is curved only slightly or in particular even not at all in the direction parallel to the push lever pivot axis 62, a substantially linear abutment on the contact surface 38 can be achieved, which minimises wear between the pressure surface 74 and the contact surface 38.

The position of the push element 72 relative to the push lever 54 is adjustable by an adjustment device designated as a whole by 92 in such a way that the contact point 76 on the contact surface 38 of the master cylinder unit 22 is positionable at different radial spacings from the push lever pivot axis 62 so as to thus change the transmission ratio with which the actuation unit 52 acts on the master cylinder unit 22 when the actuation lever 56 is arranged at a predefined spacing from the push lever pivot axis 62, since the spacing A between the contact point 76 and the push lever pivot axis 62 defines the lever arm with which the actuation unit 52 actuates the master cylinder unit 22.

If the spacing A is changed, the contact point 76 shifts relative to the push lever pivot axis 62 and thus also relative to the central axis 26 of the cylinder bore 24 and thus also of the piston 28, such that the contact point 76 can shift for example between a position on a side of the central axis 26 facing towards the push lever pivot axis 62 and a position on a side of the central axis 26 averted from the push lever pivot axis 62, or vice versa, when the spacing A is varied in order to change the transmission ratio.

A first exemplary embodiment of the adjustment device 92 provided for this purpose comprises a guide body 94, which is movably guided in a guide bore 96 in the push lever 54 in a guide direction 98, wherein the guide direction 98 in a starting position of the piston 28 extends preferably approximately parallel to a geometric plane E2 extending through the push lever pivot axis 62 and the contact point 76, wherein, with a course of the guide direction 98 approximately parallel to the geometric plane E2, the angle that the guide direction 98 has with the geometric plane E2 lies in a range between 0° and approximately 20°.

With the design of the push element 72 as a plunger 82, the central axis 84 thereof extends transversely to the guide direction 98, wherein for this purpose the plunger 82 for example is seated in a transverse bore 106 in the guide body 94 and extends, starting herefrom, in the direction of the contact surface 38.

The pressure surface 74 of the push element 72 is thus movable in the guide direction 98.

The guide direction 98 lies in particular in a geometric plane which extends transversely, preferably perpendicularly, to the push lever pivot axis 62, for example in the drawing plane of FIGS. 1 to 3.

The guide bore 96 and the guide body 94 are also arranged in a region of the push lever 52 which lies on a side of the geometric plane E2 which is opposite the side of the geometric plane E2 on which the master cylinder unit 72 is arranged.

In particular, the adjustment device 92 with the guide body 94 and the guide bore 98 lies in particular on a side of the geometric plane E1 opposite the master cylinder unit 22, which side extends perpendicularly to the central axis 26 of the master cylinder unit 22 and in which the contact surface 38 of the piston 28 extends in the unactuated starting position.

The geometric plane E1 also preferably extends parallel, in particular approximately parallel, to the guide direction 98.

In order to displace the guide body 94 in the guide direction 98, an adjustment element 112 is provided, as illustrated in an enlarged manner in FIG. 2 and FIG. 3 for example, which in particular is adjustable in a self-locking manner and for example has an external thread portion 114 forming an adjustment spindle, which external thread portion engages in a threaded bore 116 extending parallel to the guide bore 96 and serving as a spindle nut, such that the external thread portion 114 forms the adjustment spindle, which is movable in the threaded bore 116 in the direction 117 parallel to its central axis 118 by means of rotation of the adjustment element 112.

The central axis 118 preferably extends parallel to the guide direction 98.

In order to adjust the guide body 94, the adjustment element 112 is provided with an annular body 122 projecting beyond the external thread portion 114 radially to the central axis 118, which annular body engages over a portion of its outer periphery in a cutout 124 in the guide body 94, wherein the annular body 122, as considered in the guide direction 98, bears, by means of its annular surfaces 132 and 134 extending transversely to the central axis 118, against wall surfaces 126 and 128 delimiting the cutout 124 and extending transversely to the guide direction 98, such that the annular body 122 holds the guide body 94 in a defined position in the guide direction 98 by the interaction with the cutout 124.

By rotating the adjustment element 112 about the central axis 118 as axis of rotation, the external thread portion 114 and the annular body 122 are thus adjustable jointly in the direction of the central axis 118 of the threaded bore 116, whereby, on account of the coupling to the guide body 94, the guide body 94 is also movable in the guide direction 98 and is adjustable in various positions, in particular is adjustable without the possibility of leaving these positions without manual actuation of the adjustment element 112.

In order to avoid creating noise during operation on account of a necessary small play between the annular body 122 and the cutout 124, a compression spring 146 is preferably arranged between a base 142 of the guide bore 96 and an abutment surface 144 of the guide body 94 facing towards the base 142, which compression spring always acts on the guide body 94 in one direction, for example acts on the guide body such that the wall surface 128 bears against the annular surface 134.

In order to additionally define individual rotary positions of the adjustment element 112 in a secured manner, a detent device 148 is provided.

Figure 4:
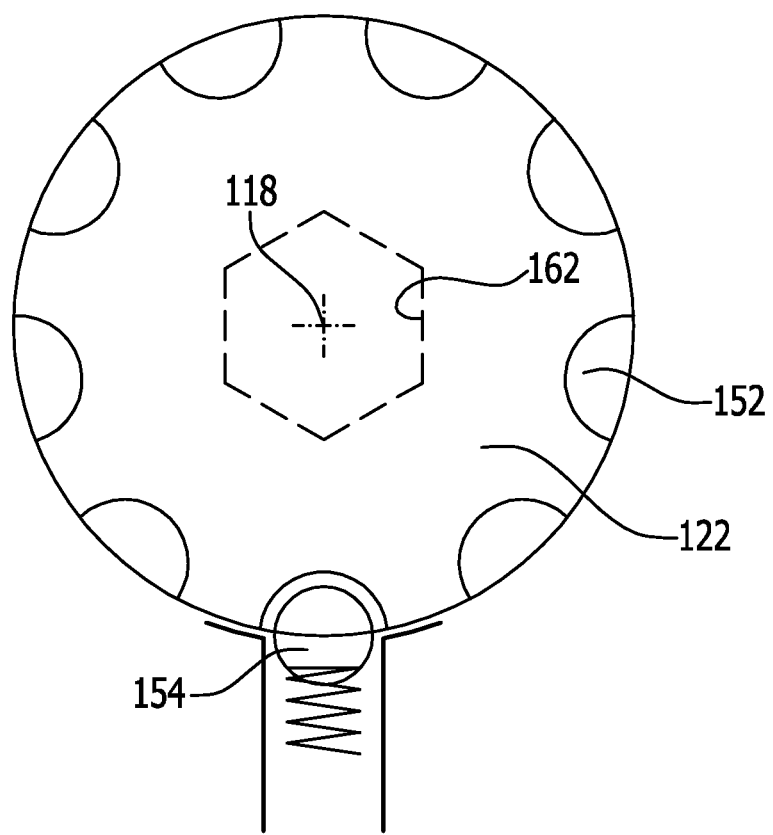
FIG. 4 shows a section along line 4-4 in FIG. 3.

In order to form the detent device, the annular body 122, as illustrated in FIG. 4, is provided peripherally with detent indentations 152, with which a detent element 154, for example a detent ball, is engageable and is guided in a detent element guide 156, for example a guide bore, extending transversely to the central axis 118 of the adjustment element 112 and is acted on in the direction of the annular body 122 by a compression spring 158.

Here, the adjustment element 112 is latchable in the positions corresponding to the positioning of the indentations 152 and therefore cannot rotate independently, for example in a manner triggered by vibrations.

A predefined rotary position of the adjustment element 112 and therefore a position of the annular body 122 in the direction of the central axis is thus maintained by the detent device 148, which, due to the coupling of the guide body 94 to the adjustment element 112, causes the position thereof as well, predefined by the adjustment element 112, in the guide direction 98 to be maintained and therefore also causes a set spacing of the contact point 76 from the push lever pivot axis 62 to also be maintained.

In order to rotate the adjustment element 112, it is provided for example with a polygonal recess 162, which serves to receive a polygonal tool, corresponding thereto, for rotating the adjustment element 112.

In order to indicate to an operator the position of the guide body 94, the guide body 94 is preferably formed such that it projects, with an end portion 172, beyond the guide bore 96 and, at this end portion 72, carries display elements 174, for example rings extending concentrically to the guide direction 98, which indicate how far the guide body 94 projects beyond the guide bore 96 and therefore indicate the position in which the guide body 94 is located in the guide direction 98 relative to the guide bore 96, and thus make it possible to determine the spacing A at which the contact point 76 lies from the push lever pivot axis 62.

Due to the adjustment device 92, when the master cylinder unit 22 is in the starting position, in particular when the piston 28 is in the starting position, an adjustment of the transmission ratio of the actuation unit 52 is thus possible without any actuation of the master cylinder unit 22, i.e. a movement of the piston 28 from the starting position.

The starting position of the piston 28, by which a free travel of the master cylinder unit 22 is predefinable, is preferably predefined by a stop element 176 which limits a pivot movement of the push lever 54 in a direction opposite the actuation direction B.

The stop element 176 can also be formed here as an eccentric, such that the free travel of the master cylinder unit 22 can be variably adjusted.

Alternatively, however, it is also conceivable to provide a stop on the housing body 18 for defining the starting position of the piston 28.

So as to additionally enable an adjustment of a reach G of the actuation lever 76 in the case of the actuation unit 52 according to the invention, i.e. an adjustment of the spacing of a grip region 182 from the handlebar 12, the actuation lever 56 is movable relative to the push lever 54.

For this purpose, the actuation lever 56 is for example mounted on the second end 66 of the push lever 54 so as to be pivotable about a joint axis 184 and adjustable by means of a reach adjustment unit 186, wherein the reach adjustment unit 186, as illustrated in particular in FIG. 2, comprises an adjustment element 192, which is arranged in the second end 66 of the push lever 54 and which has a stop surface 194, against which a stop arm 196 of the actuation lever 56 bears, wherein the stop arm 196 of the actuation lever 56 extends for example on a side of the joint axis 184 averted from the grip region 182 and thus delimits a pivotability of the actuation lever 56 relative to the push lever in the direction of the handlebar 12 due to the stop 194 adjustable by means of the adjustment element 192.

In the simplest case, the adjustment element 192 is an adjustment screw optionally provided with a detent function, which adjustment screw, with its end face, forms a stop surface 197 of the stop 194 facing towards the stop arm 196.

Furthermore, in order to keep the stop arm 196 continuously bearing against the stop 194, a compression spring 198 effective between the second end 66 of the push lever 54 and the actuation lever 56 is also provided, which continuously acts on the actuation lever 56 relative to the push lever 54 such that the stop arm 196 remains with the stop surface 197 in abutment against the stop 194 and therefore a rattling and a movement of the actuation lever 56 away from the handlebar 12 can be avoided.

Figure 5:
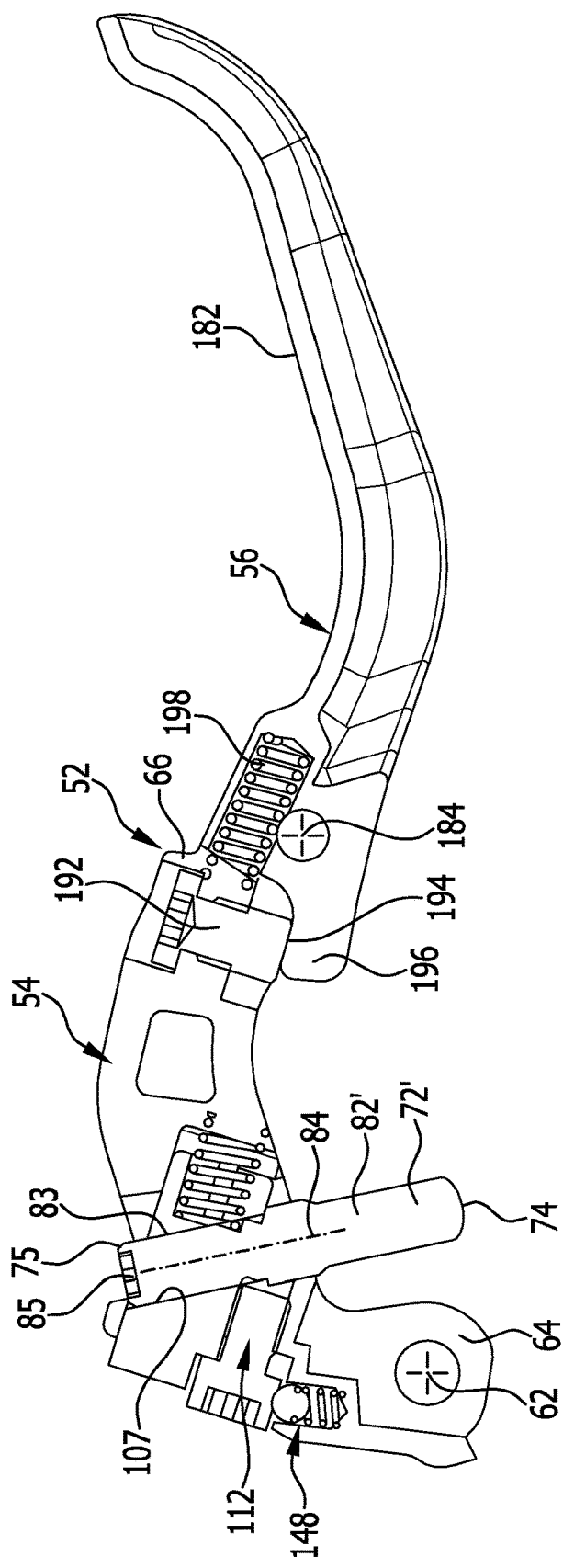
FIG. 5 shows a section similarly to FIG. 2 through a second exemplary embodiment of a master unit according to the invention.

In a second exemplary embodiment of an adjustment device 92' according to the invention, illustrated in FIG. 5, those features that are identical to those of the first exemplary embodiment are provided with the same reference signs, such that reference can be made fully to the comments made with regard to the first exemplary embodiment.

In contrast to the first exemplary embodiment, a variable adjustment of the free travel of the master cylinder unit 22 is not provided by means of the stop element 176, and instead the plunger 82' forming the push element 72' is provided, in its portion penetrating the transverse bore 106 in the guide body 94, with an external thread 83, which engages in an internal thread 107 provided in the transverse bore 106, such that, by rotating the plunger 82' about the central axis 84, a spacing of the pressure surface 74 of the push element 72' relative to the guide body 94 is adjustable and therefore the starting position of the piston 28, which defines the free travel of the master cylinder unit 22, is also adjustable.

In order to rotate the plunger 82', this is preferably provided at its end averted from the pressure surface 74 with a positively-locking contour 85, for example with a polygonal form, with which a tool provided with a corresponding polygonal form is engagable.

Figure 6:
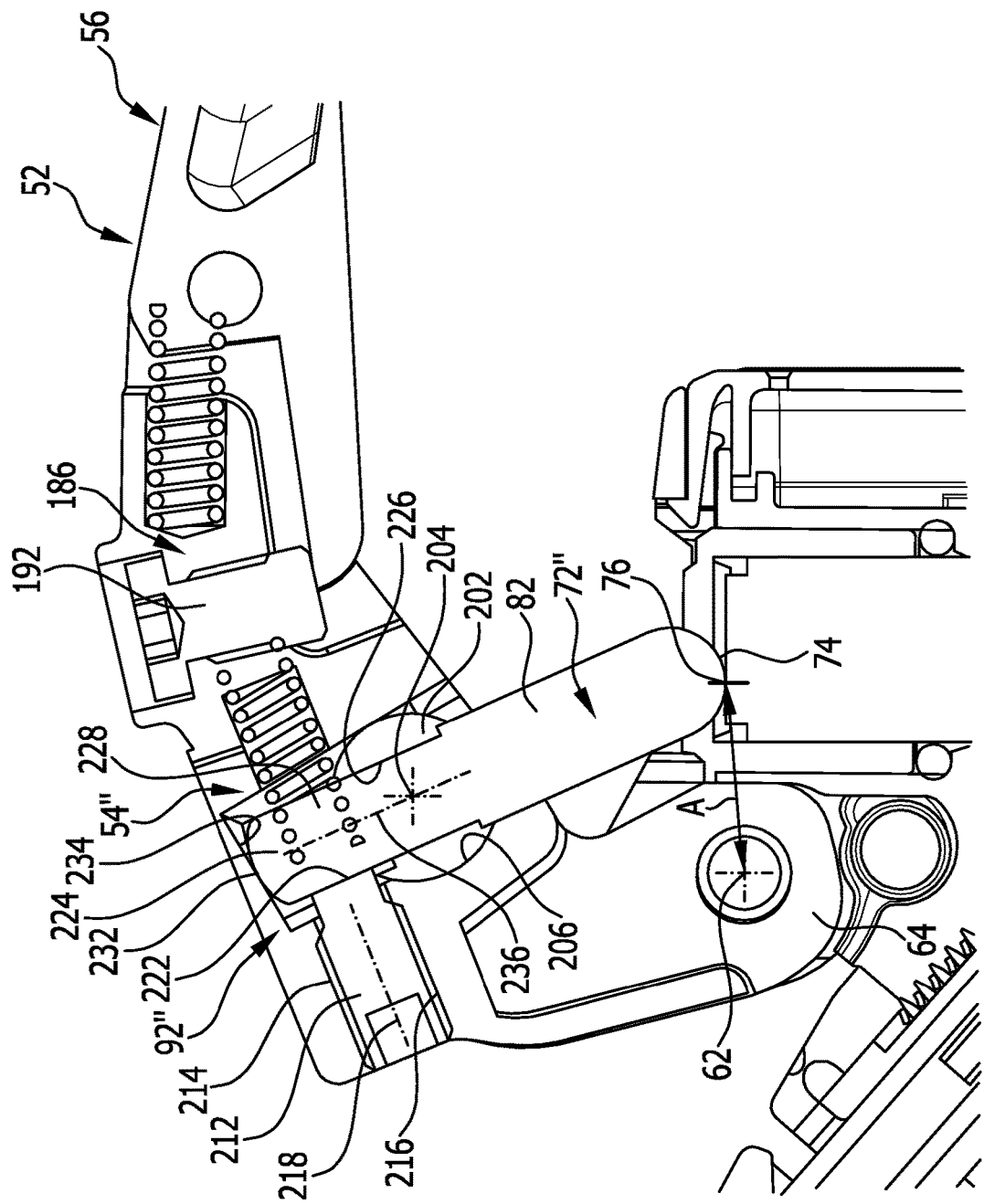
FIG. 6 shows a section similarly to FIG. 3 through a third exemplary embodiment of a master unit according to the invention.

In a third exemplary embodiment of a master unit 104 according to the invention with an adjustment device 92", illustrated in FIG. 6, those elements that are identical to those of the previous exemplary embodiment are provided with the same reference signs, such that reference is made fully to the comments in this regard.

In contrast to the first exemplary embodiment, in the case of the adjustment device 92" the push element 72" is not linearly displaceable in the guide direction 98, but instead is mounted on the push lever 54" by means of a pivot bearing body 202 so as to be pivotable about an axis 204, such that the spacing A of the contact point 76 from the push lever pivot axis 62 is adjusted by pivoting the pressure surface 74 of the push element 72 about the axis 204.

Here, the axis 204 preferably extends parallel to the push lever pivot axis 62, and the pivot bearing body 202 is preferably mounted pivotably in a pivot bearing body bore 206 in the push lever 54" extending parallel to the push lever pivot axis 62.

The pivot position of the push element 72 relative to the push lever 54" is adjusted by an adjustment element 212, which engages by means of an external thread portion 214 in a threaded bore 216 in the push lever 54", wherein a central axis 218 of the threaded bore extends in a geometric plane extending transversely, preferably perpendicularly, to the push lever pivot axis 62.

The adjustment element 212 comprises a stop surface 222, against which a stop arm 224 of the adjustment device 92" is placeable, such that the pivot movement of the push element 72 about the axis 204 is limitable as a result.

The stop arm 224 could be integrally formed on the pivot bearing body 202, for example.

In the illustrated exemplary embodiment the stop arm 224 is formed by an extension of the plunger 82 opposite the push element 72", wherein the extension 224 is formed such that the plunger 82, by means of a guide pin 228, passes through a transverse bore 226 passing through the pivot bearing body 202 transversely to the axis 204, and on the one hand this plunger is connected to the pivot bearing body 202 by means of this guide pin 228 passing through the transverse bore 226, and on the other hand this guide pin 228 forms the stop arm 224 by means of the region of the guide pin projecting beyond the pivot bearing body 202.

The guide pin 228 is preferably supported by means of a support surface 232 on a guide track 234 in the push lever 54, such that, by means of the guide track 234, the spacing of the pressure surface 74 from the axis 204 is fixable when the guide pin 228 is displaceable in the direction of its pin axis 236 in the transverse bore 226 in the pivot bearing body 202.

The guide track 234 thus makes it possible to correct the position of the contact point 76 of the push element 72" in the various pivot positions of the push element such that these do not lie over a circular path about the axis 204, but for example lie approximately in the geometric plane E1.

The invention claimed is:

1. Master unit for vehicles, in particular for vehicles steered by a handlebar, comprising a housing, a master cylinder unit provided in the housing, an actuation unit for manually actuating the master cylinder unit with a push lever which is pivotable relative to the housing about a push lever pivot axis and with a push element transmitting a movement of the push lever to the master cylinder unit, which push element is provided on the push lever and, when the actuation unit is manually actuated, acts, via a pressure surface at a contact point, on a contact surface of the master cylinder unit, a lever arm effective in the event of the actuation is adjustable between the contact point and the push lever pivot axis by means of an adjustment device that fixes the position of the push element relative to the push lever during actuation of the push lever and is operable to adjust a transmission ratio of the actuation unit with which the actuation unit acts on the master cylinder unit by positioning the contact point on the contact surface in a direction transverse to a central axis of a cylinder bore of the master cylinder unit in a starting position.

2. Master unit according to claim 1, wherein the adjustment device is arranged on the actuation unit, and in that a spacing between the contact point and the push lever pivot axis is adjustable by means of the adjustment device.

3. Master unit according to claim 2, wherein the pressure surface of the push element and the push lever pivot axis are positionable relative to one another by means of the adjustment device.

4. Master unit according to claim 1, wherein the position of the push element relative to the push lever is adjustable by means of the adjustment device.

5. Master unit according to claim 1, wherein the spacing of the contact point from the push lever pivot axis is adjustable by means of the adjustment device whilst the master cylinder unit remains unchanged in a starting position.

6. Master unit according to claim 1, wherein a contact surface of the master cylinder unit, which contact surface can be acted on by the pressure surface in the starting position of the master cylinder unit, is a surface extending transversely to a central axis of the master cylinder unit.

7. Master unit according to claim 1, wherein the adjustment device is arranged at a spacing from the contact surface of the master cylinder unit.

8. Master unit according to claim 1, wherein the adjustment device is arranged on a side of the push element averted from the master cylinder unit, and in that the push element extends from the adjustment device to the contact surface.

9. Master unit according to claim 1, wherein the actuation unit has an actuation lever, which comprises a grip region for manually acting on the actuation unit, and in that, when the actuation lever is acted on manually, it acts on the push lever in the sense of an actuation of the master cylinder unit.

10. Master unit according to claim 9, wherein the actuation lever is movable relative to the push lever.

11. Master unit according to claim 10, wherein an orientation of the actuation lever relative to the push lever is adjustable by a reach adjustment device.

12. Master unit according to claim 1, wherein the push lever is mounted via a first end region on the housing so as to be pivotable about the push lever pivot axis, and in that the push lever extends as far as a second end region, at which the actuation lever is movably mounted.

13. Master unit for vehicles, in particular for vehicles steered by a handlebar, comprising a housing, a master cylinder unit provided in the housing, an actuation unit for manually actuating the master cylinder unit with a push lever which is pivotable relative to the housing about a push lever pivot axis and with a push element transmitting a movement of the push lever to the master cylinder unit, which push element is provided on the push lever and, when the actuation unit is manually actuated, acts, via a pressure surface at a contact point, on a contact surface of the master cylinder unit, a lever arm effective in the event of the actuation is adjustable between the contact point and the push lever pivot axis by means of an adjustment device, in order to adjust a transmission ratio of the actuation unit with which the actuation unit acts on the master cylinder unit, wherein the adjustment device is configured such that, when the spacing of the contact point relative to the push lever pivot axis changes, the contact point shifts parallel to the contact surface, wherein the master cylinder unit is in its starting position.

14. Master unit for vehicles, in particular for vehicles steered by a handlebar, comprising a housing, a master cylinder unit provided in the housing, an actuation unit for manually actuating the master cylinder unit with a push lever which is pivotable relative to the housing about a push lever pivot axis and with a push element transmitting a movement of the push lever to the master cylinder unit, which push element is provided on the push lever and, when the actuation unit is manually actuated, acts, via a pressure surface at a contact point, on a contact surface of the master cylinder unit, a lever arm effective in the event of the actuation is adjustable between the contact point and the push lever pivot axis by means of an adjustment device, in order to adjust a transmission ratio of the actuation unit with which the actuation unit acts on the master cylinder unit, wherein the adjustment device comprises a guide body, which is guided movably in a guide direction on a guide mount provided on the push lever.

15. Master unit according to claim 14, wherein the guide mount and the guide body form a linear guide.

16. Master unit according to claim 14, wherein the guide direction extends approximately parallel to a plane defined by the contact surface.

17. Master unit according to claim 16, wherein the guide direction is oriented approximately parallel to a plane extending perpendicularly to the central axis of the master cylinder.

18. Master unit according to claim 14, wherein the guide body is movable in the guide direction by an adjustment element.

19. Master unit according to claim 18, wherein the adjustment element comprises an adjustment spindle, which co-operates with a spindle nut portion.

20. Master unit according to claim 19, wherein the adjustment element has an annular body, which acts on the guide body such that this is postionable in a defined manner in the guide direction.

21. Master unit according to claim 20, wherein the guide body is fixable by the annular body in both movement directions opposite one another and extending in the guide direction.

22. Master unit according to claim 21, wherein the annular body engages in a cutout in the guide body.

23. Master unit according to claim 14, wherein the adjustment element is fixable by a detent device in any of the various positions.

24. Master unit according to claim 23, wherein the annular body has at least one detent indentation, in which at least one detent element engages.

25. Master unit for vehicles, in particular for vehicles steered by a handlebar, comprising a housing, a master cylinder unit provided in the housing, an actuation unit for manually actuating the master cylinder unit with a push lever which is pivotable relative to the housing about a push lever pivot axis and with a push element transmitting a movement of the push lever to the master cylinder unit, which push element is provided on the push lever and, when the actuation unit is manually actuated, acts, via a pressure surface at a contact point, on a contact surface of the master cylinder unit, a lever arm effective in the event of the actuation is adjustable between the contact point and the push lever pivot axis by means of an adjustment device, in order to adjust a transmission ratio of the actuation unit with which the actuation unit acts on the master cylinder unit, wherein the adjustment device comprises a pivot bearing body, which is mounted on the actuation lever and by means of which the push element is pivotable about an adjustment axis.

26. Master unit according to claim 25, wherein the push element extends radially to the pivot bearing body.

27. Master unit according to claim 25, wherein the pivot position of the push element about the adjustment axis is fixable by an adjustment element acting on a stop arm connected to the pivot bearing body for conjoint rotation therewith.

28. Master unit according to claim 27, wherein the stop arm is formed by a guide pin of the push element passing through the pivot bearing body.

29. Master unit according to claim 27, wherein the push element is guided movably on the pivot bearing body radially thereto.

30. Master unit according to claim 29, wherein the push element is supported in respect of its movability radially to the pivot bearing body by a guide track arranged on the push lever.

31. Master unit according to claim 30, wherein the guide track is formed in such a way that the guide track positions the push element in such a way that the contact point when the pivot positions are changed moves approximately parallel to the contact surface.

\* \* \* \* \*